E. G. BUDD.
LATCH MECHANISM FOR AUTOMOBILE DOORS.
APPLICATION FILED NOV. 22, 1919.
1,395,477.
Patented Nov. 1, 1921.
2 SHEETS—SHEET 2.
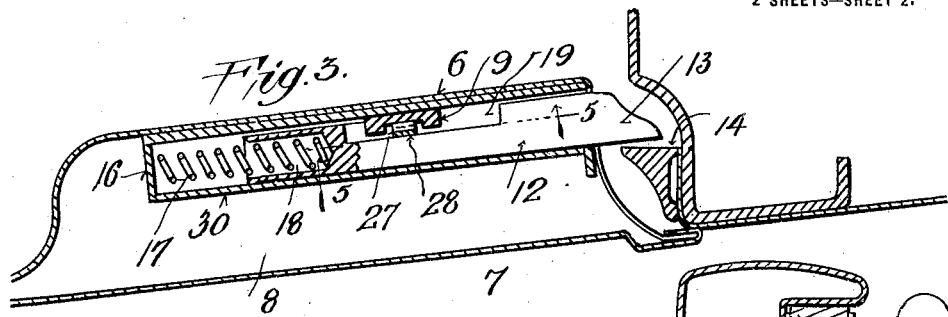
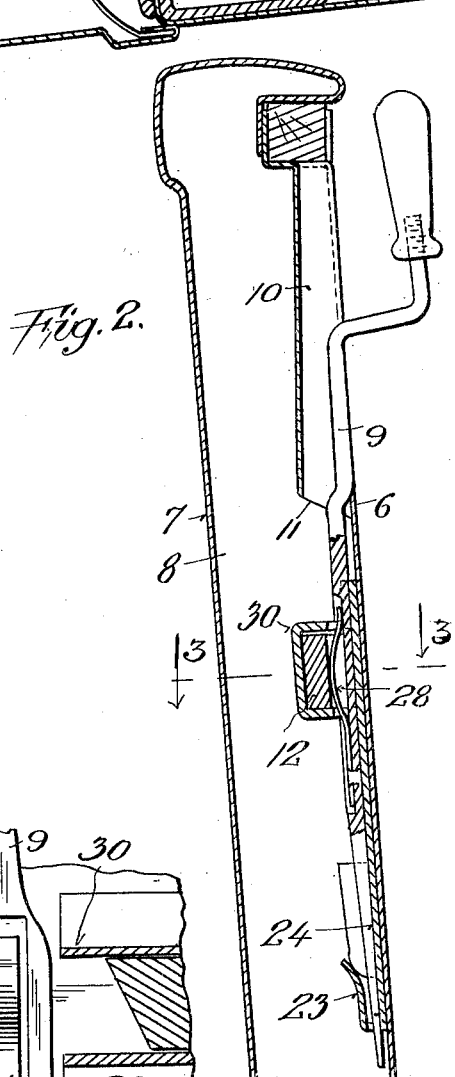
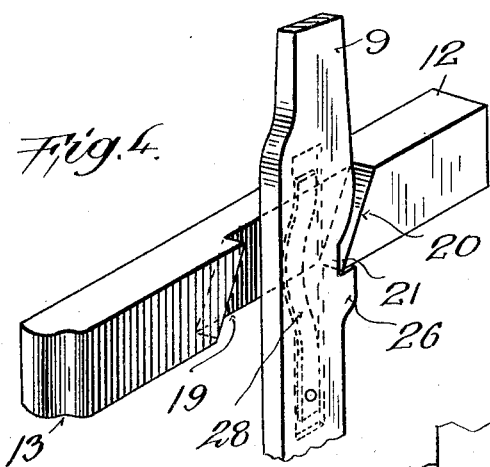
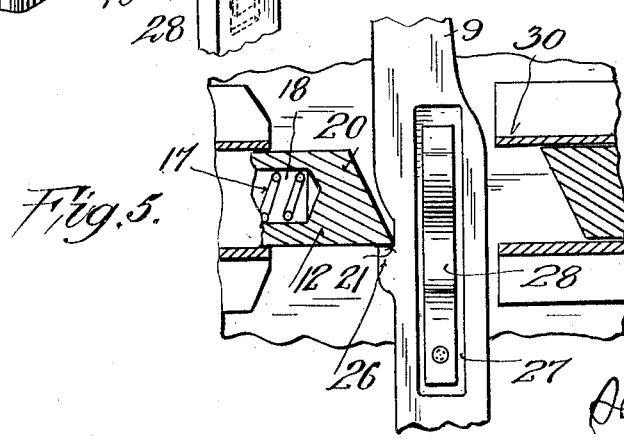

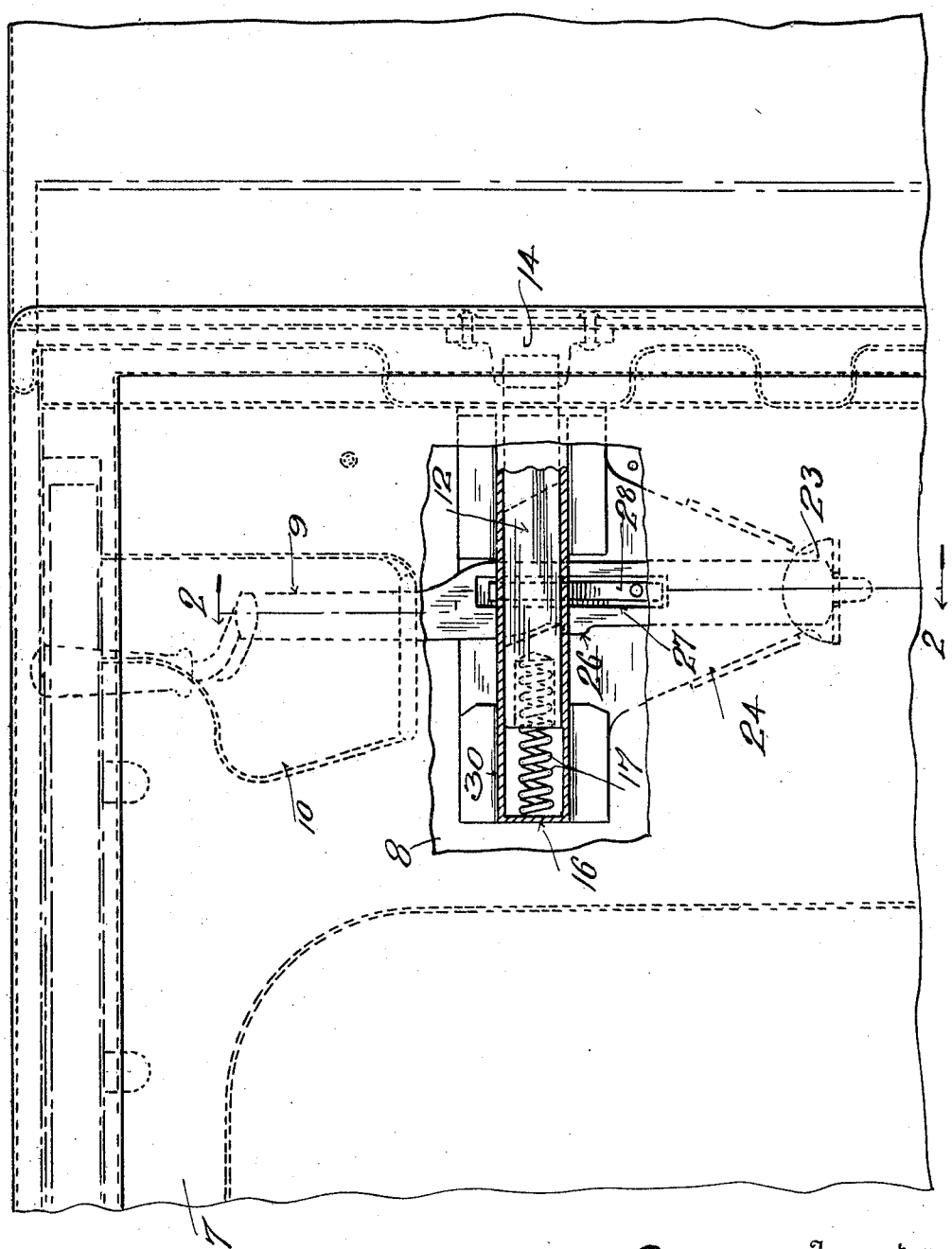

UNITED STATES PATENT OFFICE.

EDWARD G. BUDD, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

LATCH MECHANISM FOR AUTOMOBILE-DOORS.

1,395,477. Specification of Letters Patent. Patented Nov. 1, 1921.

Application filed November 22, 1919. Serial No. 339,899.

*To all whom it may concern:*

Be it known that I, EDWARD G. BUDD, a citizen of the United States, residing at Philadelphia, county of Philadelphia, State of Pennsylvania, have made a new and useful Invention in Latch Mechanism for Automobile-Doors, of which the following is a specification.

This invention relates to latch mechanism for automobile doors.

The object of the invention is to provide a latch mechanism for automobile doors which is simple in structure, economical to manufacture and efficient in operation, and wherein the parts may be easily and quickly assembled or removed.

A further object of the invention is to provide a latch mechanism of the nature referred to wherein the bolt operating lever is maintained under tension to prevent the same from rattling through looseness of mounting, whether in the direction of operation of the lever or laterally with reference to the keeper or guide in which the lever operates.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

In the drawings:—

Figure 1 is a view in elevation of a portion of an automobile door showing the application thereto of a latch mechanism embodying the principles of my invention.

Fig. 2 is a vertical section of the same through the latch mechanism on the line 2—2 of Fig. 1, looking in the direction of the arrows.

Fig. 3 is a view in horizontal section on the line 3—3 of Fig. 2, looking in the direction of the arrows.

Fig. 4 is a detached broken detail view of a portion of the operating lever shown applied to the locking bolt.

Fig. 5 is a similar view in section on the line 5—5 of Fig. 3, looking in the direction of the arrows.

The same part is designated by the same reference numeral wherever it occurs throughout the several views.

It is a common practice in automobile manufacture to construct the doors of sheet metal panels suitably pressed into the desired shape and contour and secured together at their edges to constitute the door structure, the panels being offset from each other a sufficient distance to form an interior chamber between them. It is also a common practice to locate the door locking bolt within this chamber, said bolt extending through an opening in the edge wall of the door. It is also a common practice to provide an operating lever for the bolt to retract or withdraw the latter from locking position, which operating lever extends into the chamber between the door panels for suitable engagement with the bolt, said lever being manipulated from the exterior of the chamber to accomplish the desired bolt operation. Such a structure of door and bolt operating arrangement is shown in the patent to Edward G. Budd, No. 1,214,892, granted February 6, 1917.

My present invention relates to a latch mechanism of this nature for use in connection with a door structure of the character referred to, and the special object I have in view is the provision of means in a latch structure of this nature wherein the parts may be readily and easily removed or inserted in operative relation from the exterior of the chamber formed by the door panels and wherein an operating lever is employed for actuating the locking bolt, the special feature of my present invention being directed toward the provision of means to prevent the bolt operating lever from rattling through looseness of mounting, whether from looseness of movement in the direction of bolt operating movement of said lever or from movement laterally with respect to the guide in which the lever operates.

Referring to the drawings, the inner and outer sheet metal door panels 6, 7, are stamped and shaped in desired manner as usual and are assembled and secured together in any desired way to form the door. In assembling these panels a pocket or space 8 is formed between them, into which space the lock bolt operating lever 9 extends. For this purpose a portion of one of the door panels, as for example the panel 6, is pressed out to form a recess 10 on the outer face thereof, in which the outer end of the lever is accommodated and operates. In pressing out the portion of the panel to form the recess 10 a slot or opening 11 is formed through the panel and the lever 9 extends through this opening into the chamber 8, said opening forming a guide or keeper for the lever during this bolt operating movement. The bolt 12 is formed with a rounded nose portion 13 to coöperate with the striker 14 carried by the door post 15, in the usual manner, whereby in closing the bolt will be pressed back until it clears the striker and will spring outwardly and engage behind the striker and lock the door in closed position when the nose of the bolt clears the striker. The bolt extends through an opening in the edge of the door and works in a housing 30 applied to the interior surface of the door panel 6. This housing is formed of a sheet metal stamp and is spot welded or otherwise secured to the door panel. It is formed at its extreme inner end with a laterally extending wall 16 which forms an abutment for one end of the bolt projecting spring 17. This spring is in the form of a coil and extended in length and its other end is received in the socket or cavity 18 formed in the bolt 12. This spring exerts its tension on the bolt to project the nose 13 thereof outwardly through the slot or the opening in the edge of the door. The shank of the bolt is cut away on one side thereof, as shown at 19, the rear wall of said slot being vertically inclined as shown at 20, (see Figs. 4 and 5), thereby forming a shoulder 21 at its lower edge. The bolt operating lever 9 extends transversely through openings in the sides of the housing 30 and through the space or recess 19 formed in the shank of the bolt and between the forward and rearward walls of said recess. At its extreme end the lever 9 is stepped detachably and loosely into a seat formed by turning up a lip portion 23 from the end of an extension 24 of the bolt housing stamping. The rear edge of the lever 9 is formed with a shoulder 26 which engages the corner 21 of the shank of the bolt, thereby detachably locking the operating lever in assembled position. One side surface or face of the lever is formed with a compression or seat 27 in which is mounted a leaf spring 28. This spring extends lengthwise of the lever, being secured at one end to said lever in the seat or recess 27 and transversely across the recess 19 formed in the bolt shank, and is bowed so as to bear against the side wall of the recess 19 of the bolt. This leaf spring performs the double function of retaining the operating lever 9 in place and pressed against the edges of the openings in the bolt housing through which said lever passes, thereby preventing rattling due to the looseness in mounting of the lever, whether such looseness of mounting is in the direction of throw of the lever to effect the bolt operation or whether it is lateral with respect to the guideway or keeper in which the lever rocks.

The assembling of the parts may be effected very easily and simply. The bolt with its projecting spring 17 seated in the socket 18 in the end of the bolt is inserted through the opening in the edge of the door and into the housing 30. The lever 9 with the spring 28 applied thereto is inserted through the opening 11 in the door panel and into position for the extremity of said lever to become seated in the seat formed by the lip 23. In inserting the lever 9 through the opening 11 and through the side openings in the housing 30, the bolt 12 is pressed backwardly against the tension of the spring 17 a distance sufficient to permit the lever 9 to pass transversely through the recess 19 formed in the side of the bolt shank. When the lever has been fully inserted into position, the bolt 12 is released and is moved by its spring 17 until the edge 21 thereof engages the shoulder 26 on the operating lever. The parts may be detached quickly and easily by simply reversing the above operation. The friction spring 28 carried by the lever affords simple and efficient means for preventing the looseness of mounting of the lever from causing noise and rattle.

Having now set forth the objects and nature of my invention and a construction embodying the principles thereof, what I claim as new and useful and of my own invention and desire to secure by Letters Patent is:—

1. In a latch structure, a slidably mounted locking bolt, an operating lever detachably engaging said bolt, and a spring compressed and interposed between said lever and bolt.

2. In a latch structure, a bolt housing, a bolt extending into said housing, a spring to engage said bolt and normally operating to project the same, a removable lever extending transversely through said housing and detachably engaging said bolt, and a spring disposed between said lever and bolt and yieldably pressing the bolt and lever into engagement with opposite walls of said housing.

3. In a latch structure, a bolt housing, a bolt loosely received in said housing, a spring interposed between said bolt and said housing and normally operating to project said bolt, a removable lever extending transversely with reference to said bolt and detachably engaging the latter, and a spring mounted on the side of said lever and interposed between said bolt and lever.

4. In a latch structure, a bolt housing, a bolt inserted in said housing, a spring also inserted in said housing and engaging the bolt to normally project the same, said bolt having a transverse seat in one side thereof, a removable lever extending through said seat transversely of the bolt, said lever detachably engaging said bolt, a seat or depression formed longitudinally of said lever and in the side thereof and a spring secured in said seat and disposed between said lever and said bolt.

5. In a latch structure, a bolt housing having slots therein, a bolt having a transverse seat, said bolt located within said housing and projecting therefrom, a lever having a longitudinal depression, said lever extending through said slots to engage said bolt transversely, and a spring in said depression between said lever and said bolt.

6. A latch mechanism for automobile doors including a latch bolt, and means normally operating to project said bolt into locking position, in combination with an operating lever for the latch bolt, and means interposed between said lever and bolt operating to impose a tension upon both these members.

In testimony whereof I have hereunto set my hand on this 8th day of November, A. D. 1919.

EDWARD G. BUDD.